United States Patent
Lu et al.

(10) Patent No.: US 8,544,171 B2
(45) Date of Patent: Oct. 1, 2013

(54) METHOD OF TERMINATING A FIBER OPTIC CABLE

(75) Inventors: Yu Lu, Eden Prairie, MN (US); Thomas Marcouiller, Shakopee, MN (US); Nicholas Torman, Minneapolis, MN (US); Scott Carlson, Bloomington, MN (US); Paul Suek, Eden Prairie, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/229,036

(22) Filed: Sep. 9, 2011

(65) Prior Publication Data
US 2012/0167387 A1     Jul. 5, 2012

Related U.S. Application Data

(60) Provisional application No. 61/382,676, filed on Sep. 14, 2010.

(51) Int. Cl.
*H01R 43/00*     (2006.01)

(52) U.S. Cl.
USPC ............... 29/858; 29/857; 29/860; 385/58; 385/60; 385/62

(58) Field of Classification Search
USPC ................. 29/857, 858; 385/58, 60, 62
See application file for complete search history.

(56) References Cited

U.S. PATENT DOCUMENTS

| | | | | |
|---|---|---|---|---|
| 6,811,323 B2 * | 11/2004 | Murray et al. | ................... | 385/80 |
| 7,147,384 B2 * | 12/2006 | Hardcastle et al. | ............. | 385/60 |
| 7,534,050 B2 * | 5/2009 | Kachmar | ......................... | 385/55 |
| 7,744,288 B2 * | 6/2010 | Lu et al. | .......................... | 385/60 |
| 7,756,372 B2 * | 7/2010 | Mullaney et al. | ............. | 385/100 |
| RE43,542 E * | 7/2012 | Murray et al. | ................... | 385/80 |
| 2002/0067894 A1 * | 6/2002 | Scanzillo | ......................... | 385/80 |
| 2004/0050314 A1 | 3/2004 | Williams | | |
| 2005/0213891 A1 * | 9/2005 | Hardcastle et al. | ............. | 385/60 |
| 2010/0086266 A1 | 4/2010 | Marcouiller et al. | | |
| 2010/0209067 A1 | 8/2010 | Beck | | |
| 2010/0278493 A1 | 11/2010 | Kachmar | | |

OTHER PUBLICATIONS

International Search Report and Written Opinion mailed Apr. 10, 2012.

* cited by examiner

*Primary Examiner* — Carl Arbes
(74) *Attorney, Agent, or Firm* — Merchant & Gould P.C.

(57) ABSTRACT

A method for terminating a fiber optic cable includes removing an end portion of an outer jacket of a fiber optic cable to expose a strength member and at least one optical fiber. A binder material of the strength member of the fiber optic cable is heated using a heat source to expose strength elements of the strength member. The strength elements are secured to a fiber optic connector assembly using an adhesive.

19 Claims, 11 Drawing Sheets

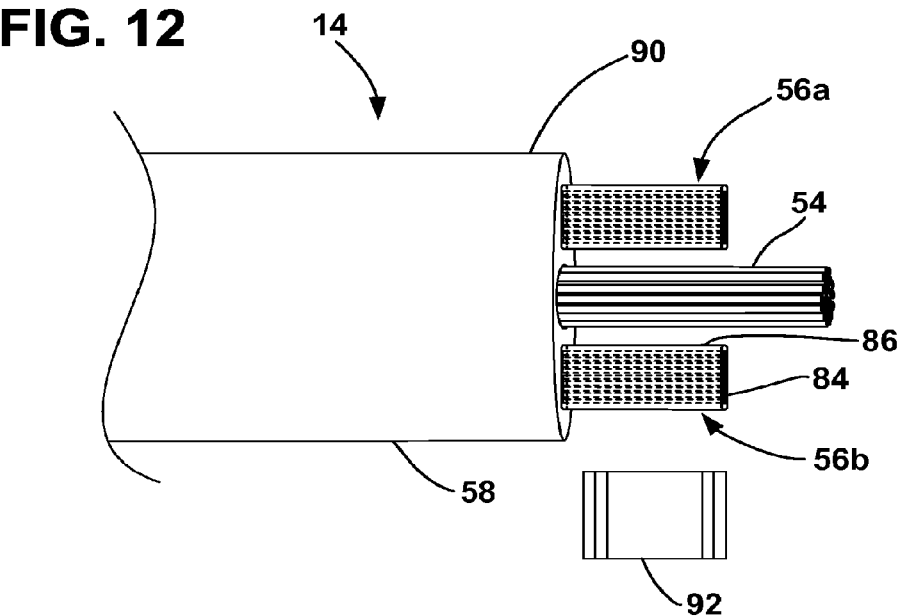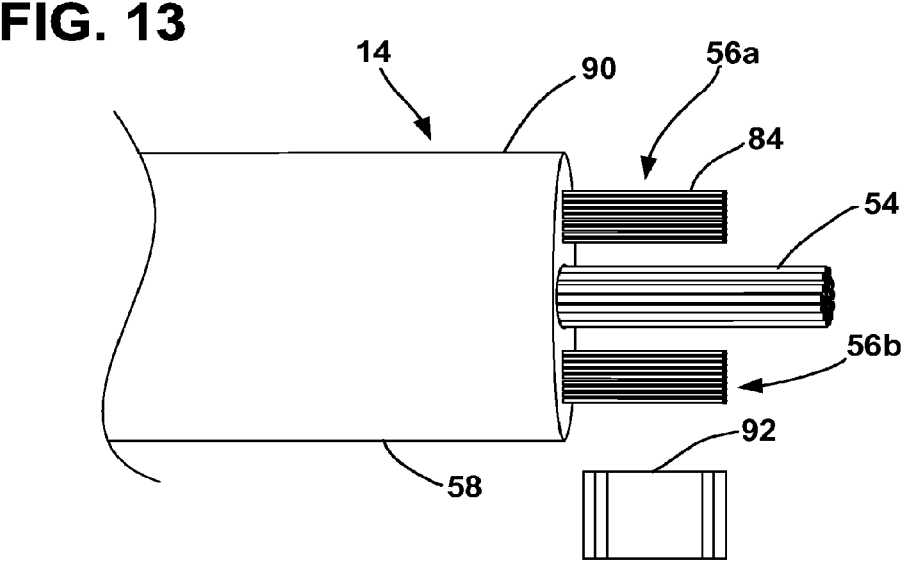

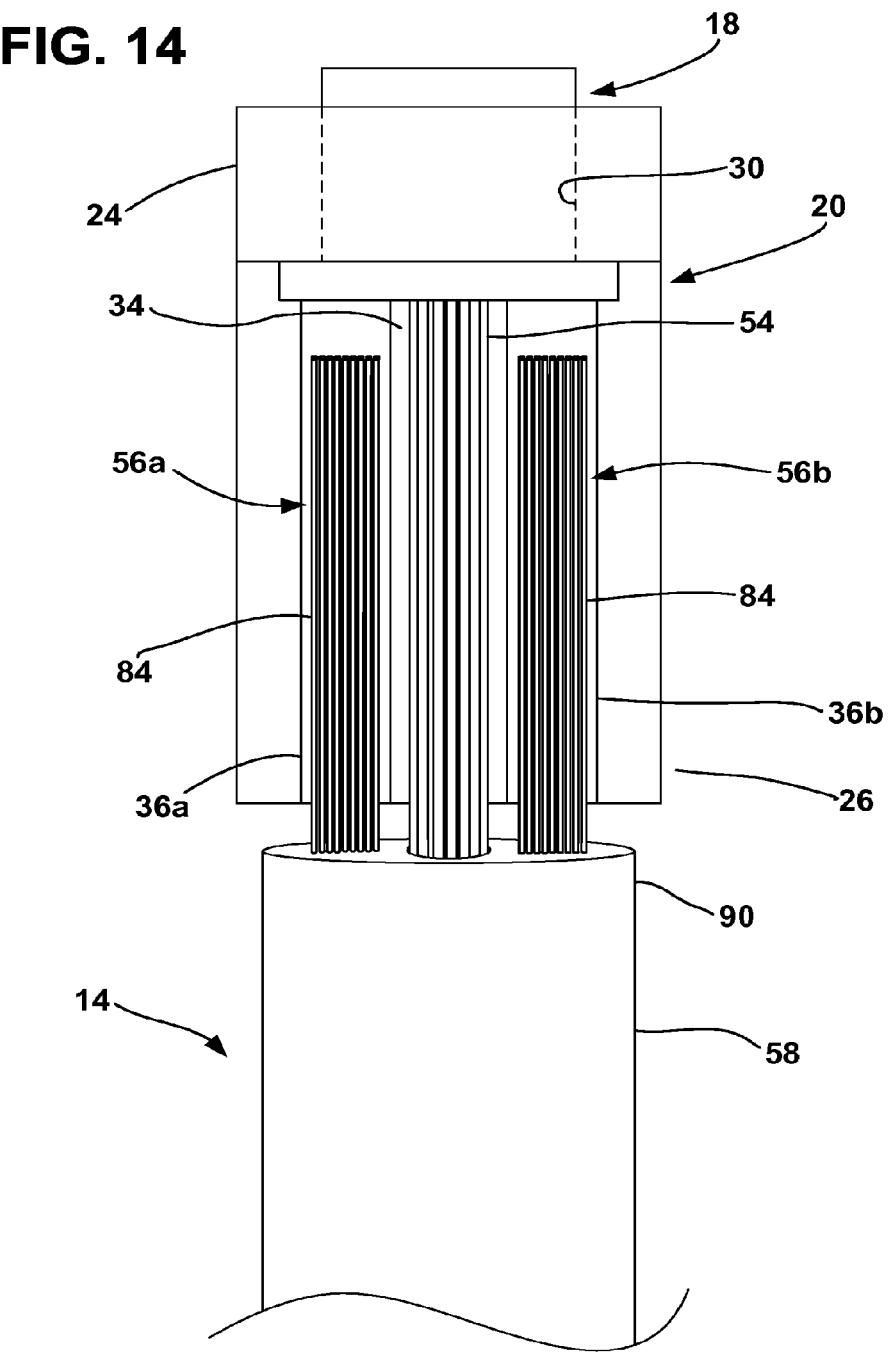

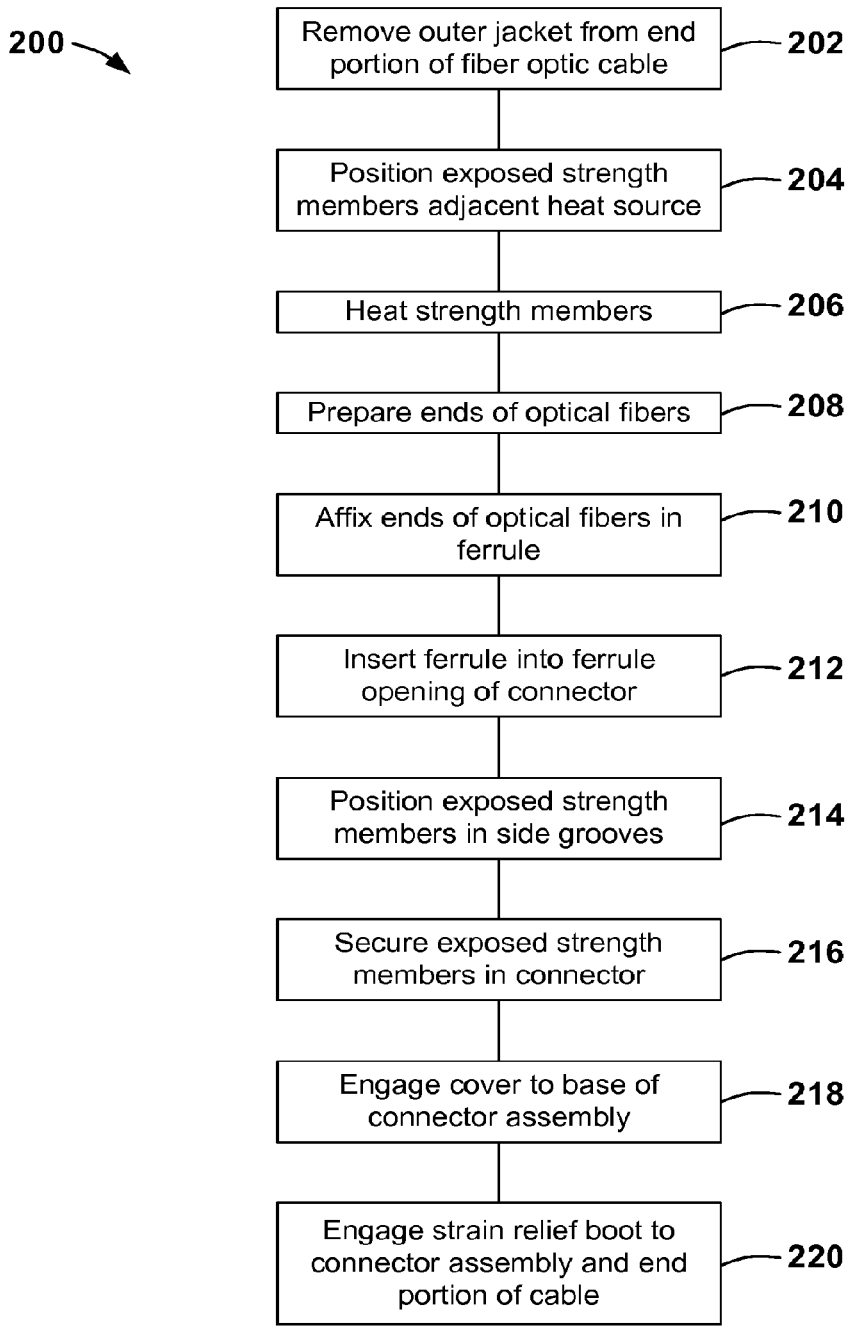

METHOD OF TERMINATING A FIBER OPTIC CABLE

CROSS REFERENCE TO RELATED APPLICATION

This application claims the benefit of provisional application Ser. No. 61/382,676, filed Sep. 14, 2010, which is incorporated herein by reference in its entirety.

BACKGROUND

A multiple fiber optic cable typically includes: (1) a plurality of optical fibers (e.g., 12, 24, 48 optical fibers per cable); (2) a buffer layer that surrounds the optical fibers; (3) a strength layer that surrounds the buffer layer; and (4) an outer jacket. Optical fibers function to carry optical signals. A typical optical fiber includes an inner core surrounded by a cladding that is protected by a coating. The buffer layer functions to surround and protect the coated optical fibers. Strength layers add mechanical strength to fiber optic cables to protect the internal optical fibers against stresses applied to the cables during installation and thereafter. Outer jackets also provide protection against chemical damages.

SUMMARY

An aspect of the present disclosure relates to a method for terminating a fiber optic cable. The method includes removing an end portion of an outer jacket of a fiber optic cable to expose a strength member and at least one optical fiber. A binder material of the strength member of the fiber optic cable is heated using a heat source to expose strength elements of the strength member. The strength elements are secured to a fiber optic connector assembly using an adhesive.

Another aspect of the present disclosure relates to a method for terminating a fiber optic cable. The method includes removing an end portion of an outer jacket of a fiber optic cable to expose a first strength member, a second strength member and a plurality of optical fibers. A binder material of the first and second strength members of the fiber optic cable is heated using a heat source to expose strength elements of the first and second strength members. Ends of the optical fibers are affixed in a ferrule. The ferrule is inserted through a ferrule opening in a body of a fiber optic connector assembly. The strength elements are secured to a fiber optic connector assembly using an adhesive.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 12 is an isometric view of the fiber optic cable assembly.

FIG. 13 is an isometric view of the fiber optic cable assembly.

FIG. 14 is a view of the fiber optic cable assembly engaged in the base of the fiber optic connector assembly.

FIG. 15 is a representation of a method for terminating a fiber optic cable assembly.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
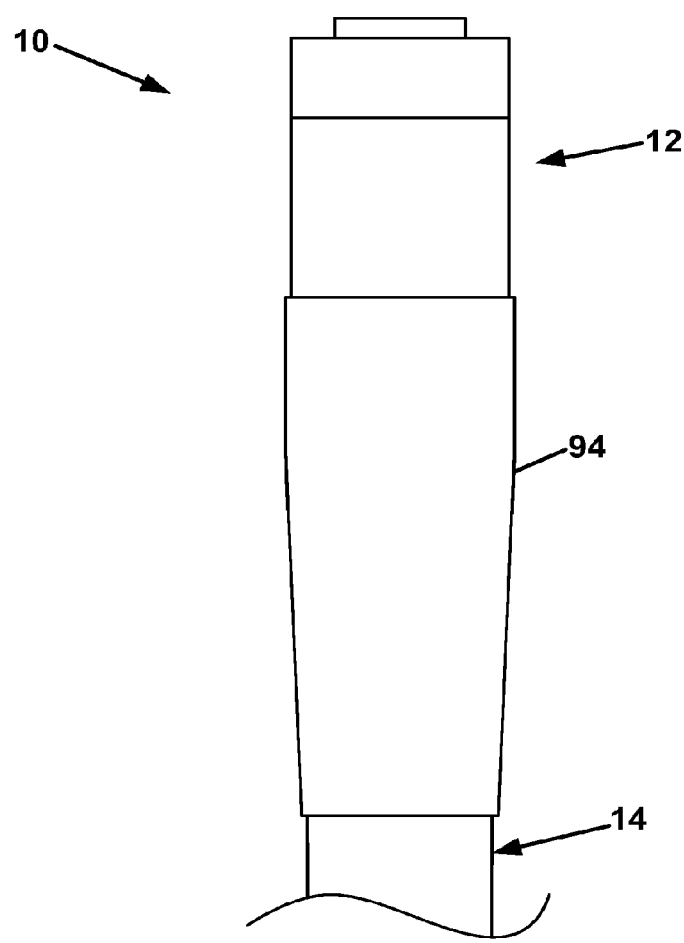
FIG. 1 is a view of a fiber optic cable assembly having exemplary features of aspects in accordance with the principles of the present disclosure.
Figure 2:
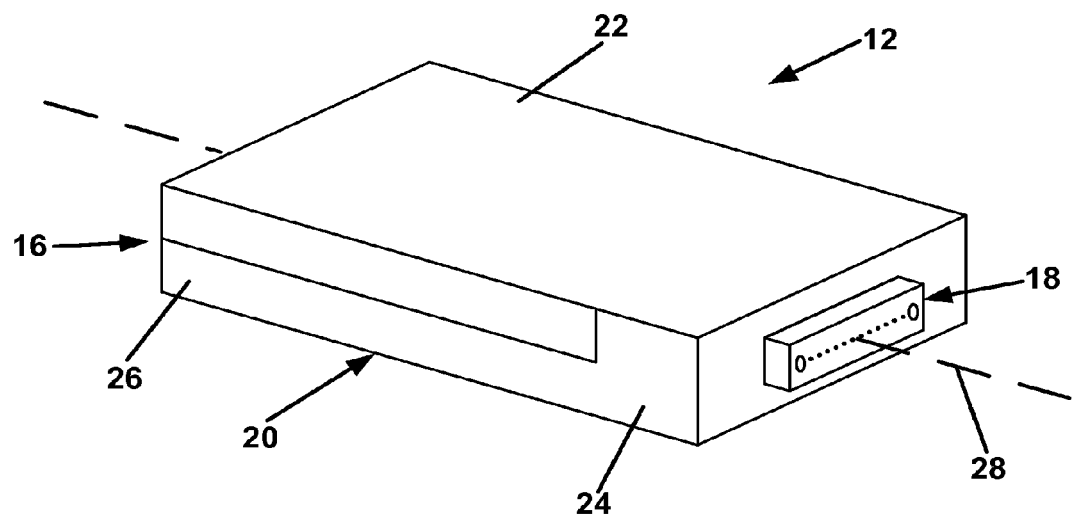
FIG. 2 is an isometric view of a fiber optic connector assembly suitable for use with the fiber optic cable assembly of FIG. 1.
Figure 3:
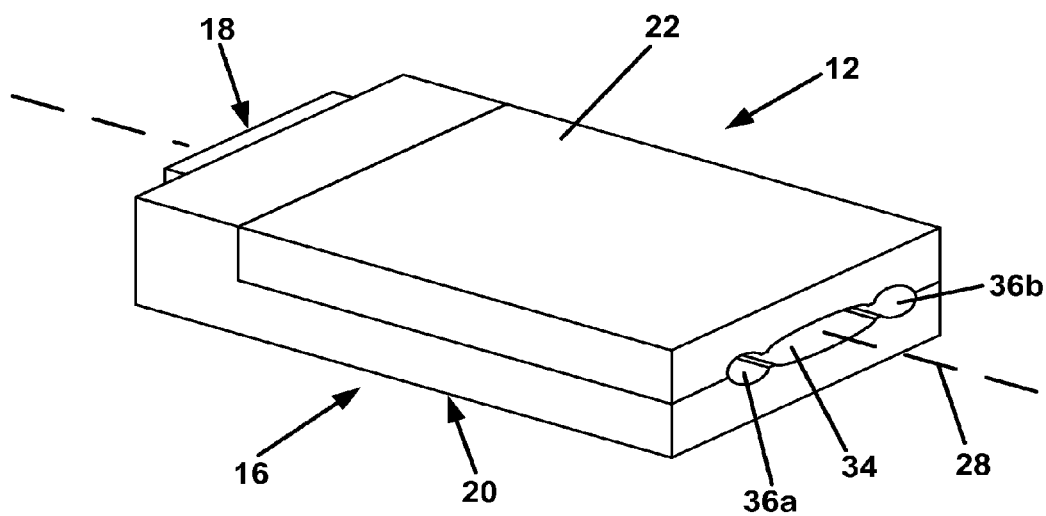
FIG. 3 is an isometric view of the fiber optic connector assembly of FIG. 2.
Figure 4:
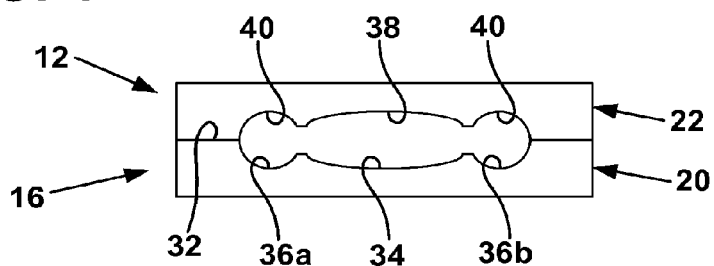
FIG. 4 is an end view of the fiber optic connector assembly of FIG. 2.
Figure 5:
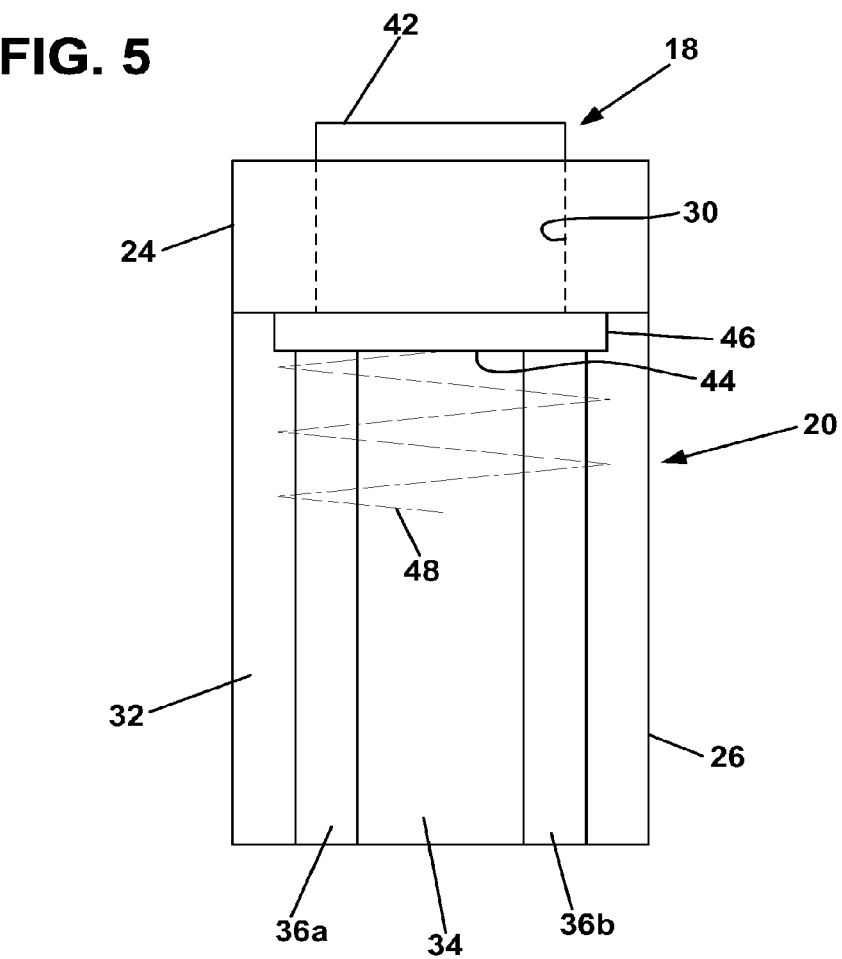
FIG. 5 is a top view of a base of the fiber optic connector assembly of FIG. 2.

Referring now to FIG. 1, a fiber optic cable assembly 10 is shown. The fiber optic cable assembly 10 includes a fiber optic connector assembly 12 and a fiber optic cable 14.

Referring now to FIGS. 2-5, the fiber optic connector assembly 12 is shown. The fiber optic connector assembly 12 includes a body 16 and a ferrule 18.

The body 16 of the fiber optic connector assembly 12 includes a base 20 and a cover 22 that is engaged to the base 20. The body 16 further includes a first axial end portion 24 and an oppositely disposed second axial end portion 26. The body 16 of the fiber optic connector assembly 12 defines a central longitudinal axis 28 that extends through the first and second axial end portions 24, 26.

The base 20 defines a ferrule opening 30 at the first axial end portion 24. The ferrule opening 30 is sized to receive the ferrule 18. The ferrule opening 30 extends axially along the central longitudinal axis 28 through the first axial end portion 24 of the base 20.

The second axial end portion 26 of the base 20 includes a first surface 32. The first surface 32 faces outwardly from the base 20 and is adapted to be oppositely disposed from a corresponding surface of the cover 22. The first surface 32 of the base 20 defines a central groove 34. The central groove 34 is centrally disposed in the first surface 32. The central groove 34 of the base 20 is adapted to receive optical fibers of the fiber optic cable 14. The central groove 34 extends along the central longitudinal axis 28.

The second axial end portion 26 of the base 20 further defines a first side groove 36a and a second side groove 36b. The first side groove 36a is generally parallel to the second side groove 36b. The first and second side grooves 36a, 36b are generally parallel to the central groove 34 and extend in the direction of the central longitudinal axis 28. The first and second side grooves 36a, 36b are adapted to receive strength members of the fiber optic cable 14.

In the depicted embodiment, the surface of the cover 22 that corresponds to the first surface 32 of the base 20 defines a second central groove 38 and side grooves 40. The second central groove 38 and the side grooves 40 are adapted for alignment with the central groove 34 and the first and second side grooves 36a, 36b of the base 20 when the base 20 and the cover 22 are engaged. In one embodiment, the cover 22 is engaged with the base 20 through a snap-fit engagement. In another embodiment, the cover 22 is engaged with the base with a fastener (e.g., screw, weld, adhesive, etc.).

The ferrule 18 is adapted to receive the optical fibers of the fiber optic cable 14. The ferrule 18 of the fiber optic connector assembly 12 includes a first end 42 and an oppositely disposed second end 44. The first end 42 is sized for receipt in the ferrule opening 30. The second end 44 includes a flange 46. The flange 46 is sized larger than the ferrule opening 30.

In the depicted embodiment, the fiber optic connector assembly 12 includes a spring 48. The spring 48 is disposed in the body 16. The spring 48 abuts the second end 44 of the ferrule 18 and biases the first end 42 of the ferrule 18 outward from the first axial end portion 24 of the body 16.

Figure 6:
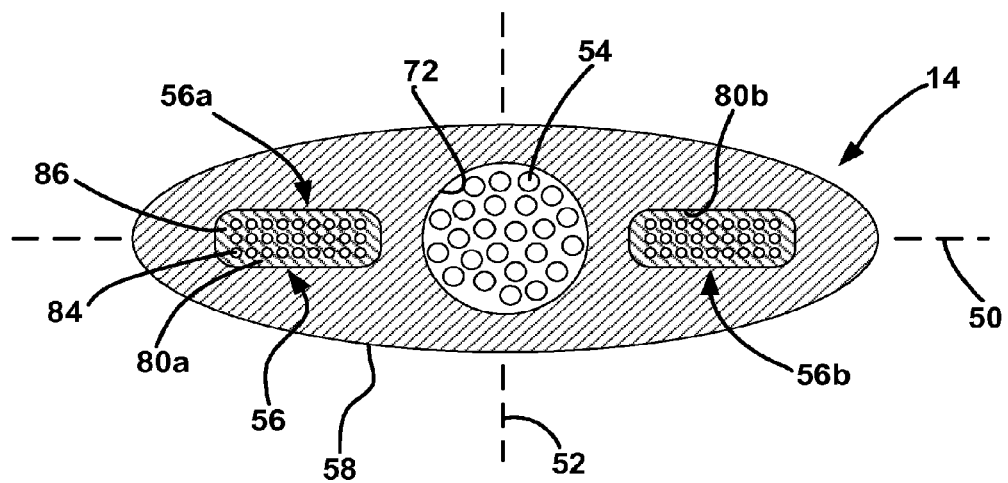
FIG. 6 is a cross-sectional view of the fiber optic cable assembly taken on line 6-6 of FIG. 1.
Figure 7:
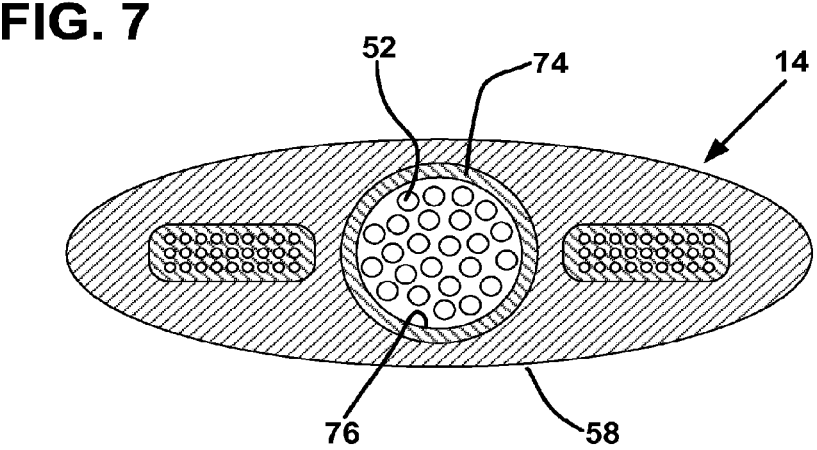
FIG. 7 is a cross-sectional view of an alternate embodiment of the fiber optic cable assembly.
Figure 8:
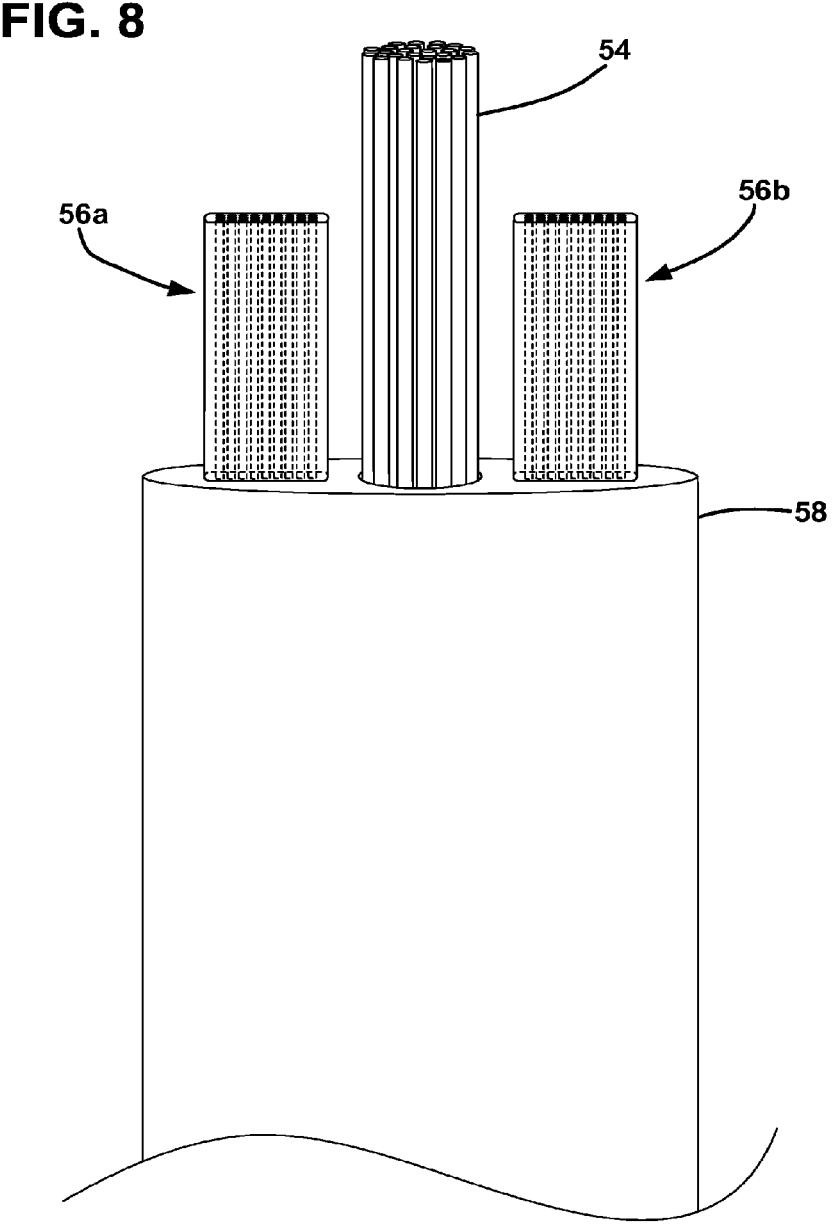
FIG. 8 is an isometric view of the fiber optic cable assembly of FIG. 6.

Referring now to FIGS. 6-8, the fiber optic cable 14 is shown. In the depicted embodiment, the fiber optic cable 14 has a non-circular outer profile. For example, as shown in FIG. 6, when viewed in transverse cross-section, the outer profile of the fiber optic cable 14 has a generally flat obround shape so that the cross-section of the fiber optic cable is longer along a major axis 50 than a minor axis 52. It will be understood, however, that the scope of the present disclosure is not limited to the fiber optic cable 14 having a non-circular profile.

The fiber optic cable 14 includes at least one optical fiber 54, a strength member 56 and an outer jacket 58 that surrounds the optical fiber 54 and the strength member 56. In the depicted embodiment, the fiber optic cable 14 includes a plurality of optical fibers 54, a first strength member 56a and a second strength member 56b.

Figure 9:
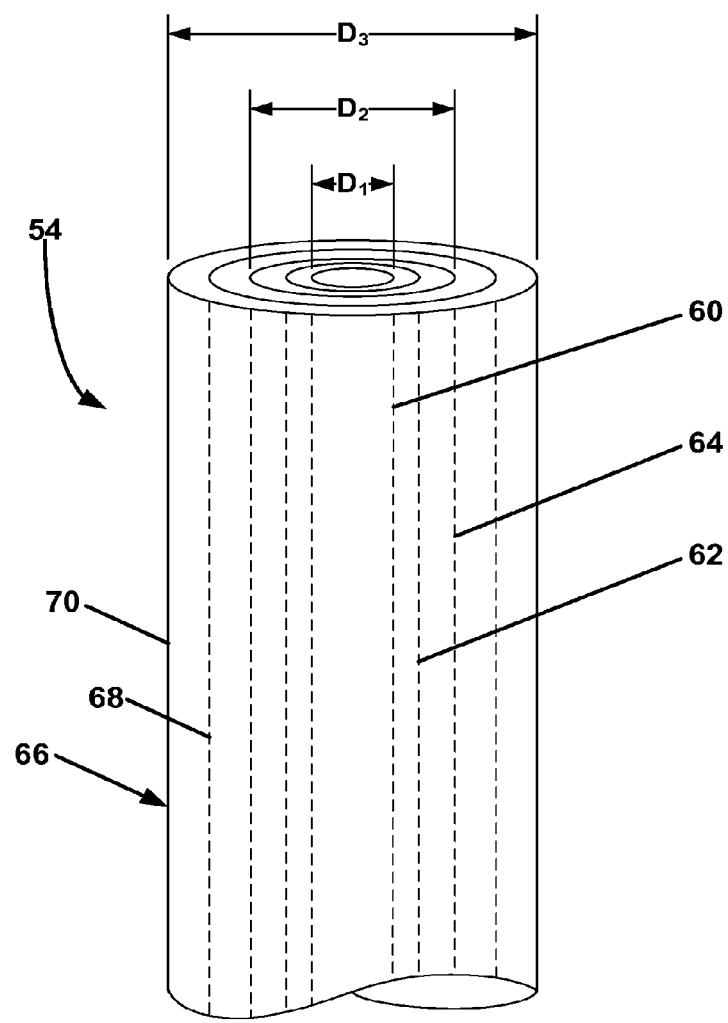
FIG. 9 is a schematic representation of an optical fiber of the fiber optic cable assembly of FIG. 6.

Referring now to FIG. 9, the optical fiber 54 includes a core 60. The core 60 is made of a glass material, such as a silica-based material, having an index of refraction. In the subject embodiment, the core 60 has an outer diameter $D_1$ of less than or equal to about 10 μm.

The core 60 of each optical fiber 54 is surrounded by a first cladding layer 62 that is also made of a glass material, such as a silica based-material. The first cladding layer 62 has an index of refraction that is less than the index of refraction of the core 60. This difference between the index of refraction of the first cladding layer 62 and the index of refraction of the core 60 allows an optical signal that is transmitted through the optical fiber 54 to be confined to the core 60.

In one embodiment, a second cladding layer 64 surrounds the first cladding layer 62. The second cladding layer 64 has an index of refraction. In the subject embodiment, the index of refraction of the second cladding layer 64 is about equal to the index of refraction of the first cladding layer 62. The second cladding layer 64 is immediately adjacent to the first cladding layer 62. In the subject embodiment, the second cladding layer 64 has an outer diameter $D_2$ of less than or equal to 125 μm.

A coating 66 surrounds the second cladding layer 64. The coating 66 includes an inner layer 68 and an outer layer 70. In the subject embodiment, the inner layer 68 of the coating 66 is immediately adjacent to the second cladding layer 64 such that the inner layer 68 surrounds the second cladding layer 64. The inner layer 68 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 68 functions to protect the optical fiber 54 from microbending.

The outer layer 70 of the coating 66 is a polymeric material having a higher modulus of elasticity than the inner layer 68. In the subject embodiment, the outer layer 70 of the coating 66 is immediately adjacent to the inner layer 68 such that the outer layer 70 surrounds the inner layer 68. The higher modulus of elasticity of the outer layer 70 functions to mechanically protect and retain the shape of optical fiber 54 during handling. In the subject embodiment, the outer layer 70 defines an outer diameter $D_3$ of less than or equal to 500 μm. In another embodiment, the outer layer 70 has an outer diameter $D_3$ of less than or equal to 250 μm.

Referring now to FIGS. 6-8 and 10, the outer jacket 58 can be shaped through an extrusion process and can be made by any number of different types of polymeric materials. Example materials for the outer jacket 58 include low-smoke zero halogen materials such as low-smoke zero halogen polyolefin and polycarbon. In other embodiments, the material can include thermal plastic materials such as polyethylene, polypropylene, ethylene-propylene, copolymers, polystyrene and styrene copolymers, polyvinyl chloride, polyamide (nylon), polyesters such as polyethylene terephthalate, polyetheretherketone, polyphenylene sulfide, polyetherimide, polybutylene terephthalate, as well as other plastic materials. In still other embodiments, the outer jacket 58 can be made of low density, medium density or high density polyethylene materials. Such polyethylene materials can include low density, medium density or high density ultra-high molecular weight polyethylene materials.

The outer jacket 58 defines a fiber passage 72 that extends through the fiber optic cable 14. In the depicted embodiment, the fiber passage 72 has a circular profile. The fiber passage 72 is centrally located in the outer jacket 58. In one embodiment, the fiber passage 72 is located at the geometrical center of the outer jacket 58. The optical fibers 54 are disposed in the fiber passage 72.

In one embodiment, a buffer tube 74 (shown in FIG. 7) is disposed in the fiber passage 72. The buffer tube 74 defines a passage 76 in which the optical fibers 54 are disposed. It will be understood, however, that the scope of the present disclosure is not limited to having a buffer tube 74.

Figure 10:
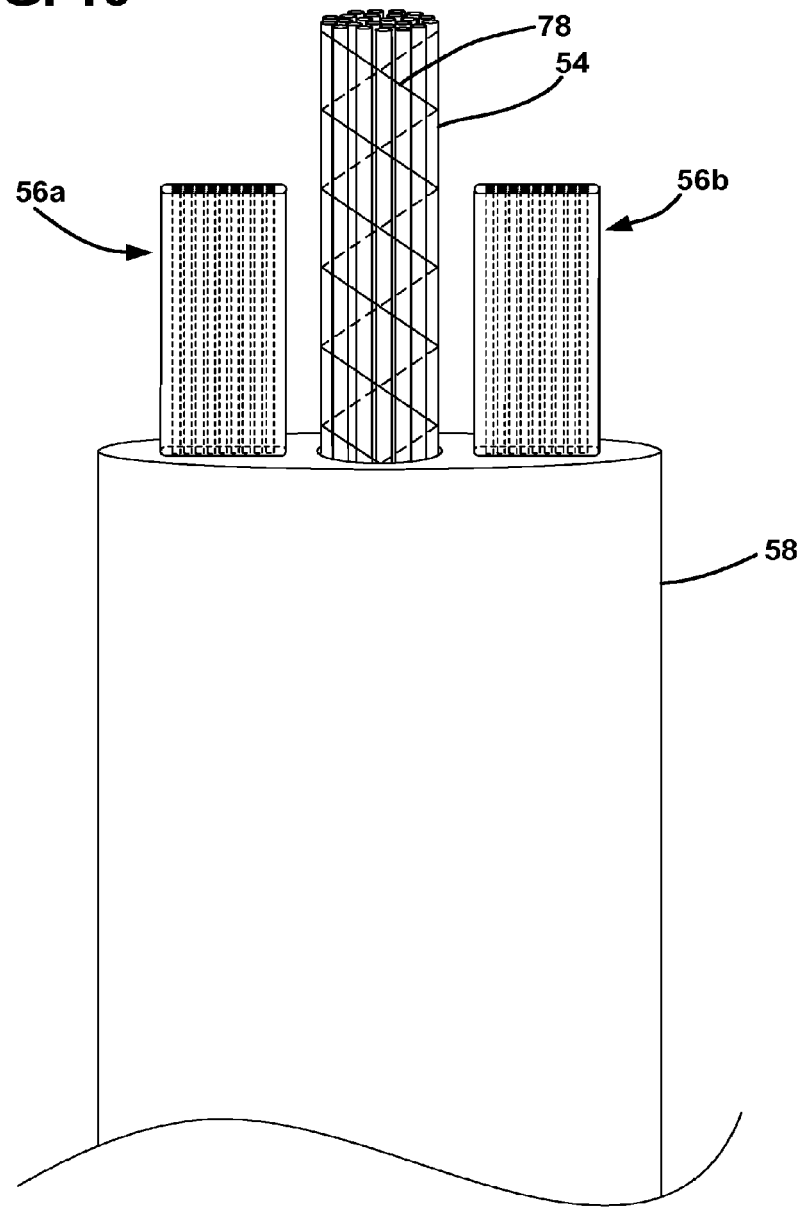
FIG. 10 is an isometric view of an alternate embodiment of a fiber optic cable assembly.

In an embodiment in which there are multiple optical fibers 54, the optical fibers 54 can be held in a fiber bundle by fiber grouping members 78 (shown in FIG. 10). The fiber grouping members 78 are disposed about the optical fibers 54.

The fiber grouping members 78 are arranged about the optical fibers 54 in a generally reverse double helical configuration along the length of the optical fibers 54. This reverse double helical configuration of the fiber grouping members 78 about the optical fibers 54 secures the optical fibers 54 together during manufacturing of fiber optic cable 14. In the subject embodiment, the fiber grouping members 78 are strands of material, where the material can be, but is not limited to, cotton string.

Referring now to FIGS. 6 and 8, the outer jacket 58 further defines a longitudinal passage 80 that is generally parallel to the fiber passage 72. In the depicted embodiment, the outer jacket 58 defines a first longitudinal passage 80a and a second longitudinal passage 80b. The first and second longitudinal passages 80a, 80b are oppositely disposed about the fiber passage 72.

Each of the first and second longitudinal passages 80a, 80b has an elongated transverse cross-sectional profile (e.g., a flattened cross-sectional profile, an oblong cross-sectional profile, an obround cross-sectional profile, etc.). The first longitudinal passage 80a is adapted to receive the first strength member 56a of the fiber optic cable 14. The second longitudinal passage is adapted to receive the second strength member 56b of the first optic cable 14.

Each of the first and second strength members 56a, 56b has a transverse cross-sectional profile that matches the transverse cross-sectional profile of the first and second longitudinal passages 80a, 80b, respectively. The first and second strength members 56a, 56b have constructions that are strong in tension. For example, in certain embodiments, the first and second strength members 56a, 56b provides the vast majority of the tensile load capacity of the fiber optic cable 14.

Each of the first and second strength members 56a, 56b includes a plurality of strength elements 84 disposed in a binder material 86. The strength elements 84 extend the length of the fiber optic cable 14. In one embodiment, the strength elements 84 are glass fibers or rods (e.g., E-glass, S-glass, etc.) while the binder material 86 is a polymeric material such as acetate acrylite (e.g., UV-cured, etc.), silicon (e.g., RTV, etc.), polyester films (e.g., biaxially oriented polyethylene terephthalate polyester film, etc.), and polyisobutylene. In other embodiments, the binder material 86 may be a matrix material, an adhesive material, a finish material, or another type of material that binds, couples or otherwise mechanically links together strength elements 84.

Figure 11:
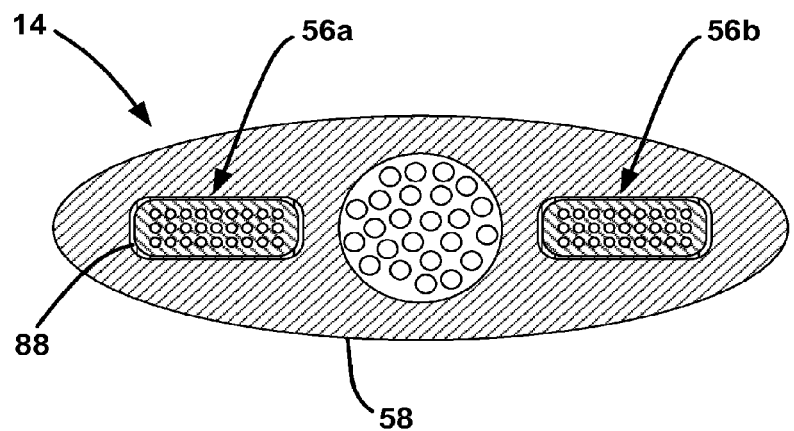
FIG. 11 is a cross-sectional view of an alternate embodiment of the fiber optic cable assembly.

In one embodiment, the first and second strength members 56a, 56b are bonded to the outer jacket 58. The bonding between the first and second strength members 56a, 56b and the outer jacket 58 can be chemical bonding or thermal bonding. In the depicted embodiment of FIG. 11, the first and second strength members 56a, 56b are coated with or otherwise provided with a material 88 having bonding characteristics (e.g., ethylene acetate) to bond the first and second strength members 56a, 56b to the outer jacket 58.

Referring now to FIGS. 1 and 12-15, a method 200 for terminating the fiber optic cable 14 will be described. In step 202, the outer jacket 58 of an end portion 90 of the fiber optic cable 14 is removed so that the optical fibers 54 and the first and second strength members 56a, 56b are exposed.

The exposed first and second strength members 56a, 56b are positioned adjacent to a heat source 92 in step 204. The heat source 92 heats the first and second strength members 56a, 56b. In one embodiment, the heat source 92 is a heating element that converts electricity to heat. In another embodiment, the heat source 92 includes a combustible fuel that is converted to heat by combustion.

In step 206, the first and second strength members 56a, 56b are heated by the heat source 92 until the binder material 86 is melted or evaporated. With the binder material 86 melted or evaporated, the strength elements 84 of the first and second strength members 56a, 56b are exposed. While the heat provided by the heat source 92 is enough to melt or evaporate the binder material 86, the heat does not structurally damage the strength elements 84.

In step 208, ends of the optical fibers 54 are prepared for insertion into the ferrule 18. In step 210, the ends of the optical fibers 54 are affixed in the ferrule 18. The first end 42 of the ferrule 18 can be subsequently polished.

In step 212, the ferrule 18 is inserted into the ferrule opening 30 of the base 20 of the fiber optic connector assembly 12. With the ferrule disposed in the ferrule opening 30, the optical fibers 54 are disposed in the central groove 34 of the base 20 of the fiber optic connector assembly 12.

In step 214, the exposed strength elements of the first and second strength members 56a, 56b are disposed in the first and second side grooves 36a, 36b, respectively. With the exposed strength elements 84 in the first and second side grooves 36a, 36b, the strength elements 84 are secured to the base 20 of the fiber optic connector assembly 12 in step 216. In the depicted embodiment, the strength elements 84 are secured to the first and second side grooves 36a, 36b. In one embodiment, the strength elements 84 are secured to the fiber optic connector assembly 12 using adhesive.

In one embodiment, the adhesive may be placed in the center groove 34 to secure the optical fibers in the center groove. In another embodiment, the adhesive used in the center groove 34 may be different than the adhesive used in the first and second side grooves 36a, 36b.

With the strength elements 84 secured to the base 20 of the fiber optic connector assembly 12, the cover 22 is engaged to the base 20 in step 218. In step 220, a strain relief boot 94 is engaged to a portion of the fiber optic connector assembly 12 and the end portion 90 of the fiber optic cable 14.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for terminating a fiber optic cable comprising:
    removing an end portion of an outer jacket of a fiber optic cable to expose a strength member and at least one optical fiber;
    heating and removing a binder material of the strength member of the fiber optic cable by using a heat source to expose strength elements of the strength member; and
    securing the strength elements to a fiber optic connector assembly using an adhesive.

2. The method of claim 1, wherein a first strength member and a second strength member of the fiber optic cable are heated using the heat source.

3. The method of claim 1, wherein the strength elements are glass fibers.

4. The method of claim 1, wherein the binder material is a polymeric material.

5. The method of claim 4, wherein the binder material is selected from the group consisting of acetate acrylite, silicon, polyester films, and polyisobutylene.

6. The method of claim 1, further comprising preparing an end of an optical fiber for insertion into a ferrule.

7. The method of claim 6, further comprising affixing the end of the optical fiber in the ferrule.

8. The method of claim 1, further comprising securing optical fibers of the fiber optic cable in a center groove of the fiber optic connector assembly.

9. The method of claim 1, wherein a material that coats the strength member and bonds the strength member to the outer jacket of the fiber optic cable is removed by the heat source.

10. The method of claim 1, further comprising installing a strain relief boot over portions of the fiber optic connector assembly and the fiber optic cable.

11. A method for terminating a fiber optic cable comprising:
    removing an end portion of an outer jacket of a fiber optic cable to expose a first strength member, a second strength member and a plurality of optical fibers;
    heating and removing a binder material of the first and second strength members of the fiber optic cable by using a heat source to expose strength elements of the first and second strength members;
    affixing ends of the optical fibers in a ferrule;
    inserting the ferrule through a ferrule opening in a body of a fiber optic connector assembly; and securing the strength elements to a center groove of the fiber optic connector assembly using an adhesive.

12. The method of claim 11, wherein the strength elements are glass fibers.

13. The method of claim 11, wherein the binder material is a polymeric material.

14. The method of claim 13, wherein the binder material is selected from the group consisting of acetate acrylite, silicon, polyester films, and polyisobutylene.

15. The method of claim 11, wherein a material that coats the strength member and bonds the strength member to the outer jacket of the fiber optic cable is removed by the heat source.

16. The method of claim 11, further comprising installing a strain relief boot over portions of the fiber optic connector assembly and the fiber optic cable.

17. The method of claim 11, the optical fibers are disposed in a passage of a buffer tube in the fiber optic cable.

18. The method of claim 11, wherein the optical fibers are bundled together using fiber grouping members.

19. The method of claim 18, wherein the fiber grouping members are arranged about the optical fibers in a reverse double helical configuration.

* * * * *